United States Patent [19]

Schweigert

[11] Patent Number: 4,699,393
[45] Date of Patent: Oct. 13, 1987

[54] MULTI-PURPOSE TRAILER WITH UNIVERSAL MOUNTING HITCH

[76] Inventor: James R. Schweigert, 5739 Juneau La., Plymouth, Minn. 55446

[21] Appl. No.: 899,755

[22] Filed: Aug. 21, 1986

Related U.S. Application Data

[63] Continuation of Ser. No. 648,763, Sep. 7, 1984, abandoned.

[51] Int. Cl.$^4$ .............................. A01D 34/12
[52] U.S. Cl. .................... 280/460 R; 56/202; 56/203; 280/656; 296/100; 298/5; 298/23 C; 298/38
[58] Field of Search ........... 280/461 R, 461 A, 460 R, 280/47.31, 456 R, 505, 656, 492; 56/202, 205, 16.7; 298/5, 6, 23 C, 7, 38; 414/488; 296/98, 100

[56] References Cited

U.S. PATENT DOCUMENTS

| | | | |
|---|---|---|---|
| 2,174,465 | 9/1939 | Jedlicka | 280/460 R |
| 2,973,224 | 2/1961 | Wall | 280/47.31 |
| 3,387,859 | 6/1968 | McClellan | 280/460 R |
| 4,158,279 | 6/1979 | Jackson | 56/202 |
| 4,192,524 | 3/1980 | Twiejtmeyer | 280/505 |
| 4,239,253 | 12/1980 | Golze | 280/460 R |
| 4,417,765 | 11/1983 | Wirsbinski | 298/5 |
| 4,484,759 | 11/1984 | Zwick | 280/460 R |

FOREIGN PATENT DOCUMENTS

| | | | |
|---|---|---|---|
| 1103768 | 3/1961 | Fed. Rep. of Germany | 280/47.31 |
| 1175999 | 8/1964 | Fed. Rep. of Germany | 280/47.31 |
| 2544681 | 10/1984 | France | 280/47.31 |
| 3429 | of 1872 | United Kingdom | 280/47.31 |

OTHER PUBLICATIONS

PeCo Lawn Vacs—Murray, 3405 Mini Vac (brochure).
Sears & Roebuck Catalog, p. 1035; Snapper Lawn Tractor (brochure).
Gilson Lawn and Garden Tractors (brochure).
Trac Vac Lawn Vacuums (brochure).
Trac Vac—The Big Trac Vac Model 1080 (brochure).
Dynamark . . . Out Front Again in '83 (brochure).
John Deere Riding Mowers & Lawn Tractors (brochure).
Super Lawns the EASY Way . . . (brochure) (E-Z Rake, Inc.).
TORO—Better From the Ground Up (brochure).
John Deere Lawn & Garden Tractors (brochure).
Simplicity (An Allis-Chalmers Company) Riding Mowers/Garden Tractors (brochure).
Ariens—Tractor Attachments 1981-82 Models (brochure).
Nothing Works Like a Horse—Wheel Horse (brochure).

*Primary Examiner*—John J. Love
*Assistant Examiner*—Everett G. Diederiks, Jr.
*Attorney, Agent, or Firm*—Merchant, Gould, Smith, Edell, Welter & Schmidt

[57] ABSTRACT

The present invention relates to a multi-purpose trailer (24) with a universal mounting hitch (26) for use with a garden tractor (22). The multi-purpose trailer (24) includes two U-shaped front ends (36) having horizontally aligned apertures (40) therein to enable two point pivotal attachment to the garden tractor (22). The trailer (24) is supported above the surface of the ground by a single, pivotal wheel (46) and further includes a trailer box (30) which is pivotal about a substantially horizontal axis proximate the back end of the trailer. The universal mounting hitch (26) includes a U-shaped bracket (151) including two spaced apart vertically extending legs (152) including a plurality of apertures (164) therein. The vertically extending legs (152) are interconnected by a horizontally extending member (154) including a plurality of apertures (158). The apertures (158) enable attachment of the U-shaped bracket (151) to the draw bar of the garden tractor (22). The apertures (164) enables attachment of the U-shaped ends (36) of the trailer (24) to the U-shaped bracket (151).

14 Claims, 13 Drawing Figures

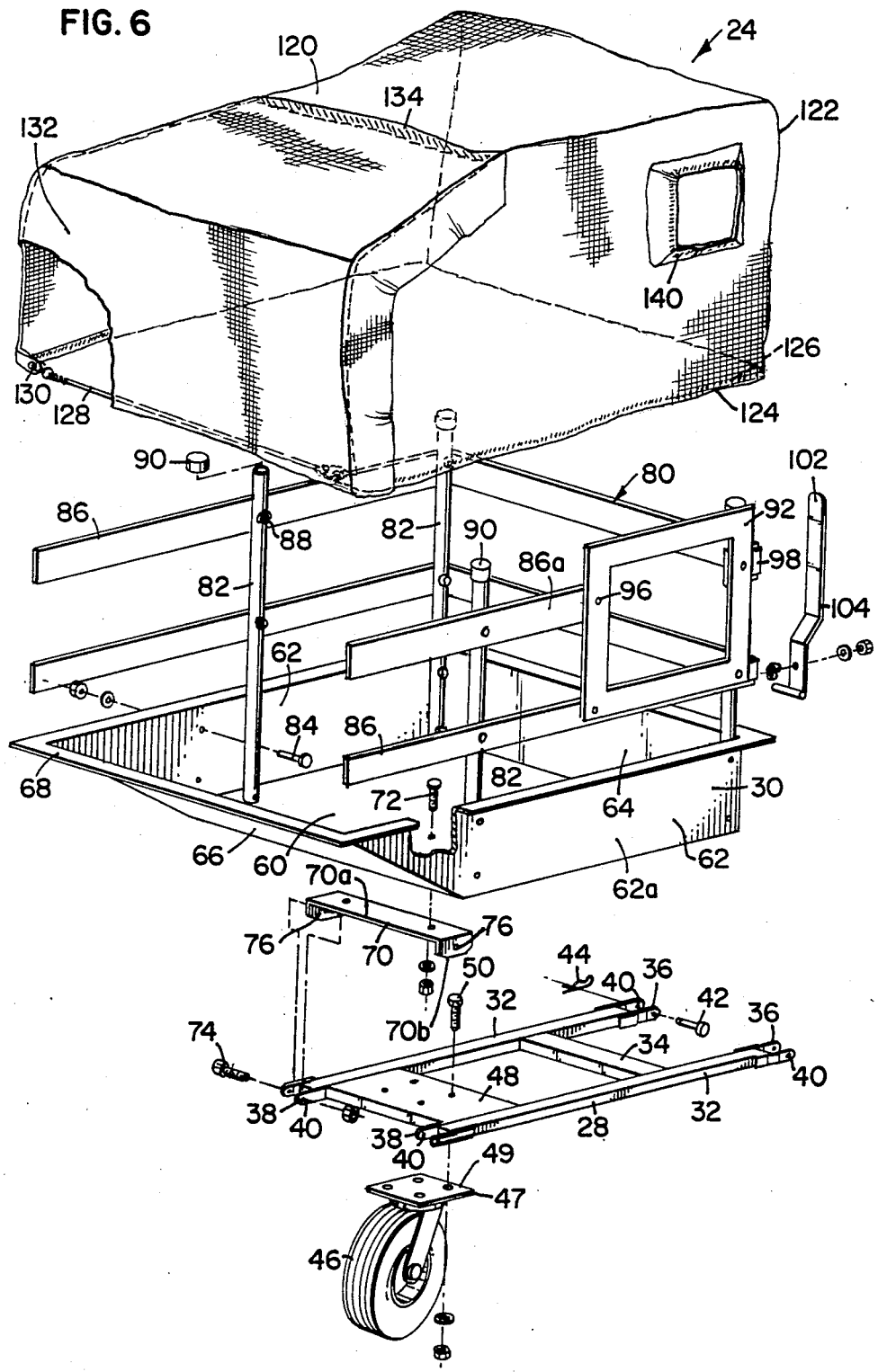

FIG. 7f
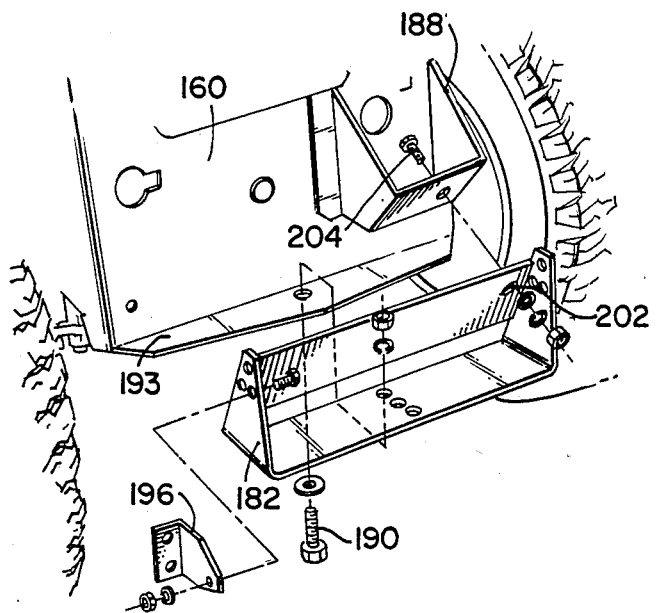
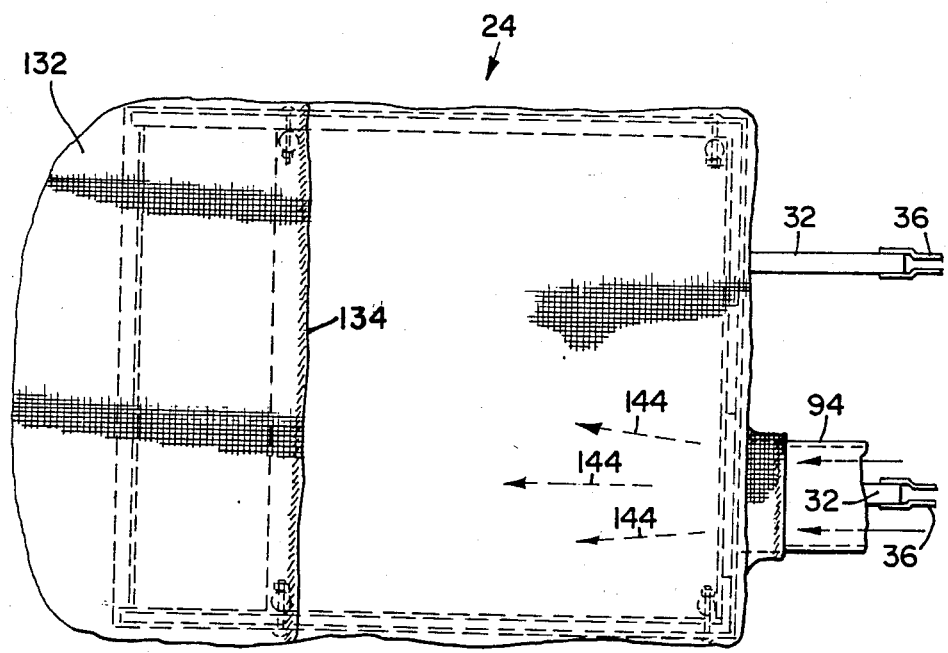
FIG. 8

MULTI-PURPOSE TRAILER WITH UNIVERSAL MOUNTING HITCH

This is a continuation of application Ser. No. 648,763, filed Sept. 7, 1984, now abandoned.

The present invention relates to a multi-purpose trailer with universal mounting hitch for use with lawn and garden tractors and the like. More particularly, the present invention relates to a multi-purpose trailer which can be readily converted to a bagger for receipt of grass clippings from the grass chute of a garden tractor and whose universal mounting hitch enables other trailers or utility carts to be hitched to the garden tractor.

Grass baggers which are pulled behind garden tractors are becoming increasingly popular. The grass baggers are pulled behind the garden tractor on a support frame typically supported above the surface of the ground by a plurality of wheels. A grass chute extending from the mower housing is interconnected to the bagger so as to provide a path for the flow of the grass clippings from the mower to the grass bagger. With some garden tractors, an auxiliary engine driven blower or the like is required in order to provide sufficient force to force the grass clippings into the bagger. However, in other garden tractors utilizing high lift blades, sufficient force is provided such that an auxiliary engine driven blower is not required.

Currently available baggers are rather expensive and are typically capable of only being used for bagging purposes. In addition, many baggers require a rather complicated mounting hitch arrangement to enable attachment to the garden tractor. Furthermore, many of the baggers commercially available are difficult to unload. Many must be emptied quite frequently, as they are not of sufficient size.

The present invention solves these and many other problems associated with currently available baggers.

SUMMARY OF THE INVENTION

The present invention relates to a multi-purpose trailer and universal mounting hitch for attachment to a garden tractor, the multi-purpose trailer being adaptable for receipt of grass clippings from a grass chute of the garden tractor. The present invention includes a trailer having a back end facing away from the garden tractor and a front end facing the garden tractor. The trailer includes an H-shaped support framework, including two longitudinally extending, spaced apart elongated members and a transversely extending elongated member interconnecting the longitudinally extending members. The longitudinally extending members each have U-shaped front ends with each of the ends having a pair of horizontally aligned apertures therein. The H-shaped support framework is supported above the surface of the ground by at most a single wheel. The wheel is pivotally interconnected to the H-shaped support framework for pivotal motion about a generally vertical axis, the wheel being located closer to the back end of the H-shaped support framework than the front end. The trailer further includes a trailer box including a floor, two vertically extending sides, a vertically extending front side, and a slanted backside, the sides of the trailer box having a top and bottom. The sides of the trailer box include an outwardly extending flange along the top thereof. The trailer box is pivotally interconnected to the H-shaped frame by a substantially U-shaped bracket for pivotal motion about a horizontal axis disposed proximate the back end of the H-shaped frame. The U-shaped bracket is fixedly secured to the floor of the trailer box and pivotally interconnected to the longitudinally extending members of the H-shaped frame. The trailer further includes a support framework rising above the trailer box, including vertically extending support members fixedly secured to the sides of the trailer box and horizontally extending members secured to the vertically extending support members. Latching means is provided for releasably latching the trailer box to the H-shaped support framework. A flexible, perforated fabric cover adapted to removably fit over the support framework rising above the trailer box and enclosing the trailer box is provided. The fabric cover includes elongated tension means extending along a bottom edge of the fabric cover proximate the back end of the trailer box for placing the bottom edge of the fabric cover in tension, the bottom edge of the fabric cover cooperating with the outwardly projecting flange to removably retain the fabric cover on the trailer. The fabric cover includes a flap portion proximate the back end of the trailer adapted to be folded over the front of the fabric cover to expose the back end of the enclosed trailer box. The fabric cover includes an access port for interconnection of the grass chute of the garden tractor. The universal mounting hitch comprises a U-shaped bracket including two spaced apart vertically extending legs interconnected by a horizontal support member. A brace member extends between the vertically extending legs of the U-shaped bracket. The horizontal member includes a plurality of apertures at differing longitudinal locations enabling attachment to a drawbar of the garden tractor by a pin-like member. The vertical legs include a plurality of apertures at differing vertical positions, each of which are adapted to cooperate with the apertures in each of the U-shaped front ends of the longitudinally extending elongated members of the H-shaped frame to receive a pin-like member. The pin-like members provide for pivotal movement of the longitudinally extending elongated members about a substantially horizontal axis.

The present invention is particularly advantageous in that it is easy to use. The universal hitch and clevice-like ends of the trailer enable easy attachment and removal of the multi-purpose trailer from the garden tractor. Further, the multi-purpose trailer is readily converted from a grass bagger to a general utility trailer by removal of the fabric cover. The multi-purpose trailer, when used as a grass bagger, further provides for quick and complete dumping of the clippings contained therein. In one particular embodiment of the present invention, the multi-purpose trailer box is capable of pivoting the front end upward substantially 90° so as to enable removal of the grass clippings from the back end. Further, in yet another embodiment of the present invention, a single latch handle is used to releasably secure the trailer box to the H-shaped support frame.

Yet another particular advantage of the present invention is its increased volume for grass clippings.

Yet another particular advantage of the present invention is its inexpensive nature. The present invention can be used in a host of applications. The multi-purpose trailer being capable of being used as a grass bagger or a general utility cart. Further, the universal mounting hitch of the present invention enables the multi-purpose trailer to be removed and another device to be hitched to the garden tractor.

Still another advantageous feature of the present invention is the provision for distribution of weight between the multi-purpose trailer and the garden tractor. This enables the single supporting wheel to swivel easier and results in less damage to the lawn because there is less weight placed on the wheel.

Yet another advantageous feature is the universal nature of the hitch, which enables the hitch to be used with many different garden tractors and trailers. In one embodiment of the present invention, the universal hitch provides a draw bar hole for attachment of other devices.

Still another advantage of the present invention is the provision for a spaced apart, two point attachment of the multi-purpose trailer to the universal hitch. The two point attachment provides for vertical pivotal movement of the multi-purpose trailer being pulled over uneven ground and yet prevents the trailer from jackknifing when backing up.

The single wheel configuration of the present invention provides for a highly maneuverable trailer with the wheel being pivotal about a vertical axis.

Another advantageous feature of the present invention is the use of a perforated porous cover material which provides for venting of air thereby doing away with the requirement for any additional vents in the cover.

These and various other advantages and features of novelty which characterize the invention are pointed out with particularity in the claims annexed hereto and forming a part hereof. However, for a better understanding of the invention, its advantages, and objectives attained by its use, reference should be had to the drawings which form a further part hereof, and to the accompanying descriptive matter, in which there is illustrated and described the preferred embodiment of the invention.

BRIEF DESCRIPTION OF THE DRAWINGS

In the drawings, reference numerals and letters indicate corresponding parts throughout several views.

FIG. 6 is an enlarged exploded perspective view of the trailer shown in FIG. 1;

FIGS. 7A through 7F are enlarged exploded perspective views of various embodiments of universal mounting hitches in accordance with the principles of the present invention; and FIG. 8 is a top plan view similar to FIG. 2 of an alternate embodiment of the multi-purpose trailer of the present invention wherein the multi-purpose trailer provides for a front end entrance for the grass chute as opposed to a side entrance as shown in FIG. 2.

DETAILED DESCRIPTION OF THE PREFERRED EMBODIMENT

Figure 1:
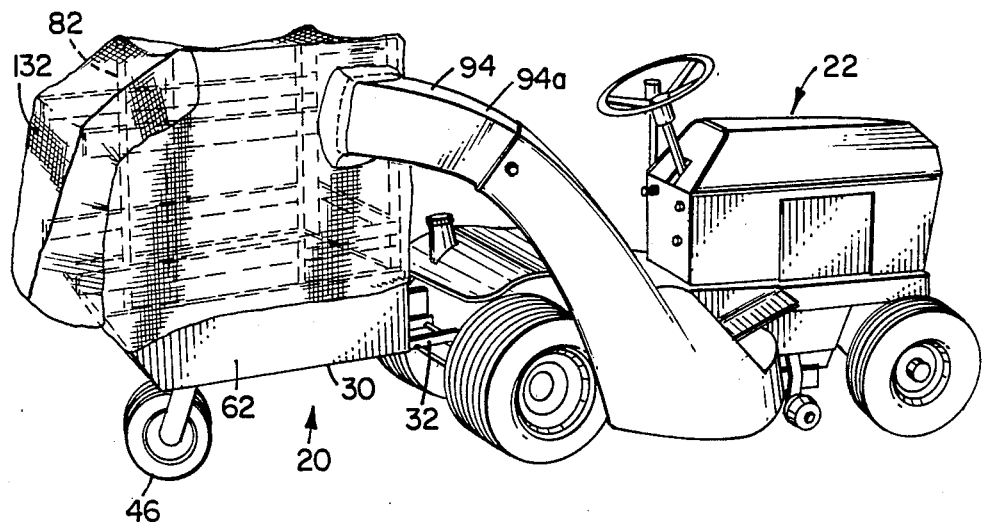
FIG. 1 is a view in perspective of an embodiment of a multi-purpose trailer with universal mounting hitch in accordance with the principles of the present invention interconnected to the draw bar of a garden tractor.

Referring now to the drawings, there is shown in FIG. 1 a preferred embodiment of the present invention, generally designated by the reference numeral 20 interconnected to a garden tractor 22. As further illustrated in FIGS. 1 through 6, the multi-purpose trailer and universal mounting hitch arrangement 20 includes a multi-purpose trailer 24, an embodiment of which is shown in FIGS. 2, 3, 5 and 6, and a universal mounting hitch 26, an embodiment of which is shown in FIG. 4. It will be appreciated, that the multi-purpose trailer 24 and the universal mounting hitch 26 each have a particular utility and might be used separate from the other.

More particularly, as illustrated in FIG. 6, the multi-purpose trailer 24 includes an H-shaped support framework 28 for supporting a trailer box. The H-shaped support framework 28 includes two longitudinally extending, spaced apart elongated rectangular members 32 interconnected by a transversely extending elongated rectangular member 34. The longitudinally extending elongated members 32 includes clevice-like front and back ends 36 and 38, respectively, having a U-shaped configuration with a pair of horizontally aligned apertures 40 and 42, respectively. The apertures 40 are adapted to removably receive a clevice pin 42 which in turn is adapted to removably receive a cotter pin 44. A wheel 46 is interconnected to a transversely extending rectangular member 48 proximate the back end of the H-shaped support frame 28 by a swivel assembly 47 for 360° pivotal motion about an axis. The swivel assembly 47 shown is a commercially available forked swivel wheel assembly with encased bearings. The swivel assembly 47 is largely spindleless so as to reduce the overall height of the trailer. The axis about which the wheel 46 rotates is slightly offset from the vertical as is common with many such swivel assemblies. The weight distribution of the trailer is such that the wheel 46 will readily swivel when the trailer is backed up. The swivel assembly 47 includes a rectangular plate member 49 which is secured to the rectangular member 48 by suitable fasteners 50.

The trailer box includes a floor 60, two vertically extending sides 62, a vertically extending front side 64, and a slanted back side 66 oblique with respect to the floor 60. The sides 62, 64 and 66 of the trailer box 30 include an outwardly extending horizontal flange 68 along the top edge thereof providing additional structural integrity. The trailer box 30 is pivotally interconnected to the ends 38 of the H-shaped frame 28 by a substantially U-shaped bracket 70 for pivotal motion about a horizontal axis disposed proximate the back end of the H-shaped frame 28 in back of the wheel 46. The U-shaped bracket 70 is fixedly secured to the floor 60 by suitable fasteners 72 and is pivotally connected to the ends 38 along a horizontal portion 70a by suitable fasteners 74 extending through the aligned apertures 42 in the ends 38 and apertures 76 in vertically extending leg portions 70b of the U-shaped bracket 70.

The trailer box 30 has attached thereto a support framework 80 rising above the trailer box 30. The support framework 80 includes elongated, vertically extending support members 82 fixedly secured to the sides of the trailer box 30 by suitable fasteners 84. Horizontally extending elongated rectangular members 84, typically made of wood, are secured to the elongated support members 82 by suitable fasteners 88 along the sides 62 and front side 64. As illustrated in FIG. 6, the elongated support members 82 might include plastic end caps 90 insertable over the end of the members 82. Suitably attached to the support framework 80 along the right side 62a of the trailer box 30 is a rectangular frame 92 adapted for receipt of a grass chute 94 from the garden tractor 22. In the embodiment illustrated, one of the horizontally extending members 86a has been cut away so as to not interfere with the opening into the trailer box provided by the rectangular frame 92, the rectangular frame being suitably secured by fasteners 96. L-shaped metal brackets 98 might be utilized at the intersection of the horizontally extending members 86 to provide additional structural integrity to the support framework 80.

Figure 5:
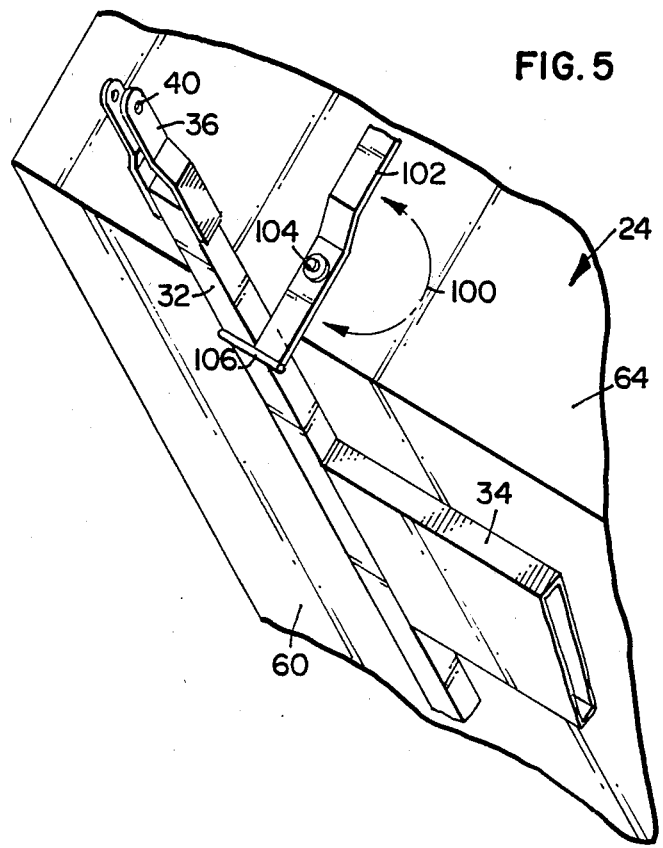
FIG. 5 is a partial diagramatic view of the underside of the trailer shown in FIG. 1 illustrating an embodiment of a latch handle used to releasably secure the trailer to its support framework.

As illustrated in FIGS. 5 and 6, pivotally interconnected on the outside of the front side 64 of the trailer box 30 for pivotal motion about a longitudinally extending axis as generally illustrated by arrows 100 is a vertically extending elongated latch handle 102. The latch handle 102 is pivotally secured by a suitable fastener 104 to the front side 64. The latch handle 102 includes a transversely projecting member 106 adapted to releasably engage the underside of one of the longitudinally extending elongated members 32 of the H-shaped support frame 28 when the latch handle is pivoted clockwise. When the latch handle 102 is pivoted counterclockwise the transversely extending member 106 releases the longitudinally extending elongated member 32 such that the trailer box 30 can be pivoted proximate its back end to enable dumping of the trailer contents. To dump the trailer contents, the operator simply pivots the latch handle 102 counter clockwise and then pushes upward on the front end of the trailer box 30. The trailer box 30 will pivot about a substantially horizontal axis extending through the aligned apertures 42 in the ends 38. As illustrated in FIG. 3 by the phantom line 110, the trailer box 30 is capable of pivoting more than 90° so as to facilitate dumping of the contents.

A flexible, perforated fabric cover 120 is configured and adapted for releaseable insertion over the support framework 80 so as to enclose the trailer box 30. The fabric cover 120 and the trailer box 30 cooperate to provide an enclosed receptacle for grass clippings. The perforated fabric cover 120 allows for the release of air, which is needed to maintain the flow of grass through the grass chute into the enclosed tractor box. The fabric cover 120 is sewn to include seam lines 122 such that the fabric cover 120 includes front and back ends and sides corresponding generally to that of the support framework 80. The fabric cover 120 shown in FIG. 3 has pockets 121 sewn in its side portions proximate the back end of the trailer for receipt of the ends of the horizontally extending members 86. Extending along a bottom edge of the fabric cover is a hem portion 124 including an elastic member 126. Positioned along a bottom edge of the fabric cover 120 proximate the back end of the trailer box 30 is an elastic cord member 128 releasably interconnected to eyelets 130 in the bottom edge of the fabric cover 120 for retaining the fabric cover 120 on the trailer box 30. The elastic cord member 128 places the elastic member 26 along the bottom edge of the cover in increased tension, the elastic member 26 in turn cooperating with the flange 68 to releasably retain the fabric cover 120 which is readily removed by releasing the elastic cord member 128 from the eyelets 130. In order to reduce wear of the fabric cover 120, the flange 68 might be rounded in the corners. The fabric cover 120 includes a separate flap portion 132 sewn to the remainder of the fabric cover 120 along a transversely extending seam 134 such that the flap portion 132 can be folded over a front portion of the fabric cover, as shown by phantom line 132 in FIG. 3, when dumping the trailer contents. Accordingly, before dumping the trailer, the user will bring the flap portion 132 forward over the front end of the fabric cover 120 so as to provide 35 an outlet for the grass clippings at the back end of the trailer. The flap portion 132 includes a hem portion 131 and an elastic member 133 along a bottom edge similar to that of the cover 120 to facilitate retaining the flap portion 132 on the framework 80 when in the covered position and when pulled forward. Accordingly, no additional fasteners are required to retain the flap portion 132 in either the closed or open position.

Figure 2:
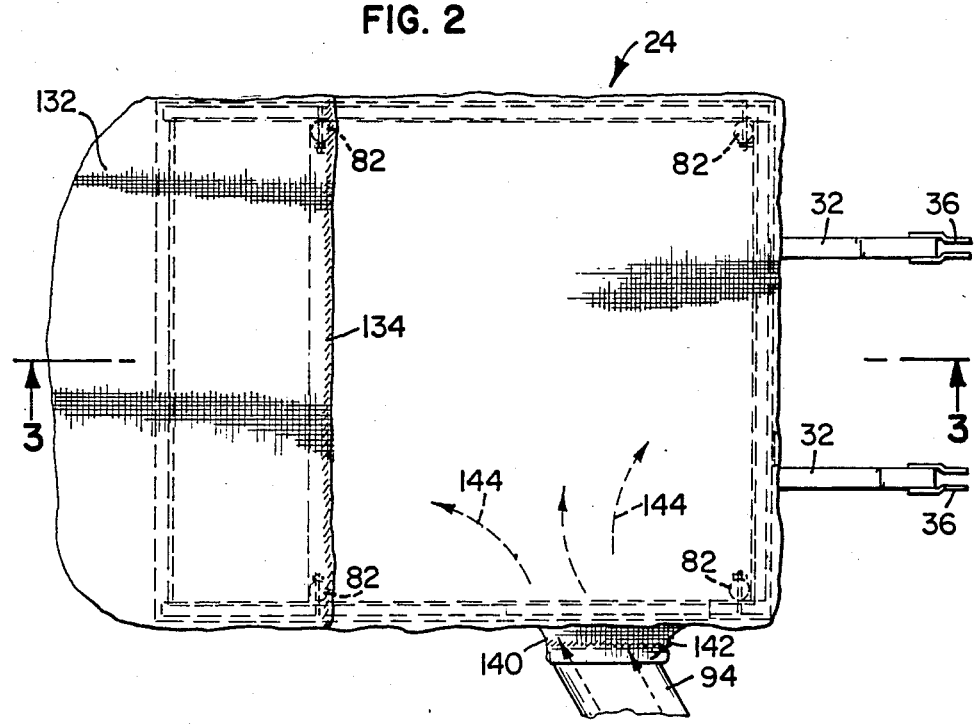
FIG. 2 is a partial top plan view of the trailer shown in FIG. 1.
Figure 3:
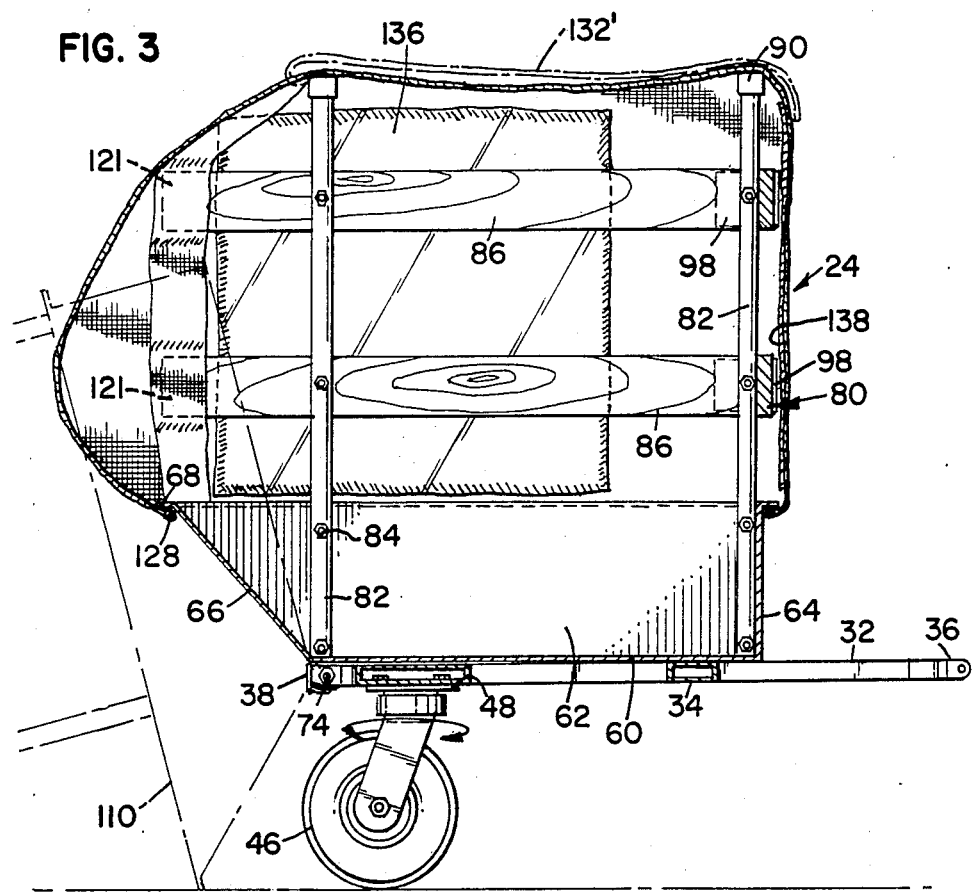
FIG. 3 is a sectional view generally along line 3—3 in FIG. 2 with the trailer shown by phantom line in a dumped configuration and with a flap portion of the fabric cover pulled forward.
Figure 4:
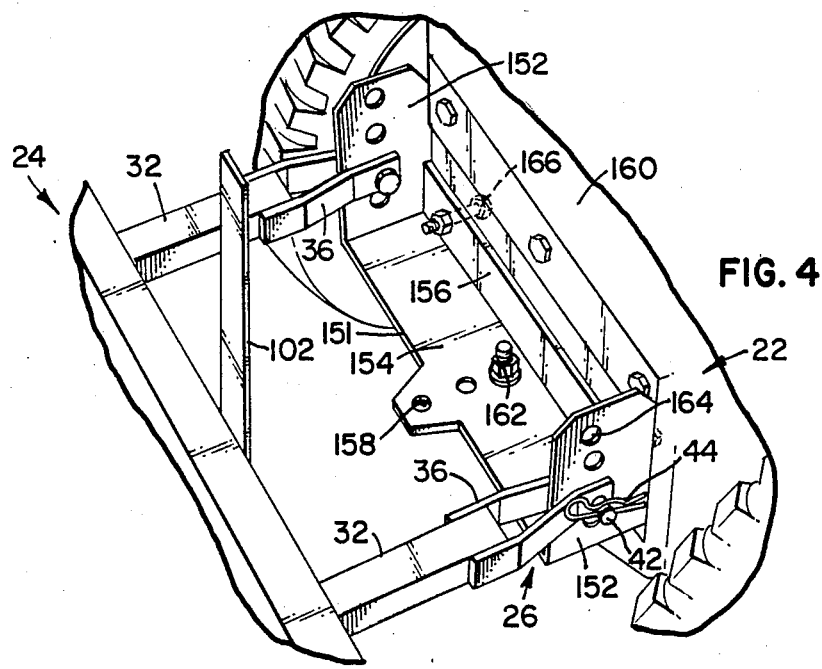
FIG. 4 is a partial view in perspective of an embodiment of a universal mounting hitch in accordance with the principles of the present invention.

As illustrated in FIGS. 2 and 3, the fabric cover 120 will preferably include a dust shield 136 on the side of the fabric cover opposite the side to which the grass chute 94 is attached. The dust shield 136 is preferably located partially along the side wall proximate the back end of the trailer. Additionally, a dust shield 138 is preferably located along the front end of the fabric cover to prevent exhausting of dust toward the rider on the tractor. As further illustrated in FIG. 2, the fabric cover 120 includes a fabric boot 140 sewn onto the fabric cover 120 including an elastic-like band 142 about the circumference thereof so as to enable a substantially tight fit about the grass chute 94. The flow of the grass clippings into the enclosed trailer box is illustrated generally by the arrows 144.

As illustrated in FIG. 8, in an embodiment of the present invention the grass chute 94 may enter the front end of the fabric cover 120 particularly when the trailer 24 is farther removed from the garden tractor 22.

Illustrated in FIG. 4 is an embodiment of the universal mounting hitch 26 attached to the draw bar (not shown) of the garden tractor and interconnected to the multi-purpose trailer 24. The universal mounting hitch 26 includes a generally U-shaped bracket 151 including two spaced apart vertically extending legs 152 interconnected by a horizontally extending support member 154. In the embodiment shown, a horizontally extending, vertically upright elongated brace member 156 extends between the vertically extending legs 152. The horizontal support member 154 includes a plurality of aligned apertures 158 positioned at varying distances from a back plate 160 of the tractor. In the embodiment shown, the aperture 158 closest to the back plate 160 receives a suitable fastener 162 for attachment of the universal hitch to the draw bar of the garden tractor 22. The U-shaped bracket 151 serves as an extension of the draw bar as the outer most aperture 158 serves as an aperture for interconnecting other utility carts or the like to the universal hitch when the multi-purpose trailer 24 of the present invention is removed therefrom. The vertically extending legs 152 include a plurality of vertically aligned apertures 164 at varying vertical heights, the corresponding apertures in each of the respective legs 152 being aligned with one another. The legs 152 are adapted to receive the clevice-like ends 36 of the H-shaped to support frame 28. Accordingly, to attach the multi-purpose trailer 24 to the universal hitch 26, the apertures 40 of the ends 36 are aligned with selected ones of the apertures 164 in the legs 152 and the cotter pin 42 inserted therethrough. This provides for a vertically pivotal connection of the multi-purpose trailer 24 to the universal hitch 26 and substantially prevents horizontal pivotal movement about a vertical axis at the ends 36. Furthermore, support is provided for each of the ends 36 thereby providing the multi-purpose trailer 24 with increased handling characteristics. The multi-purpose trailer 24, due to this two point hitch connection, will not jackknife and will also pivot up and down over uneven ground. The brace member 156 in the embodiment shown in FIG. 4 includes fastener members 166 for fastening the U-shaped bracket 151 to the back plate 160 of the garden tractor 150 to keep the U-shaped bracket rigid and prevent pivoting about the fastener 162.

Figure 7A:
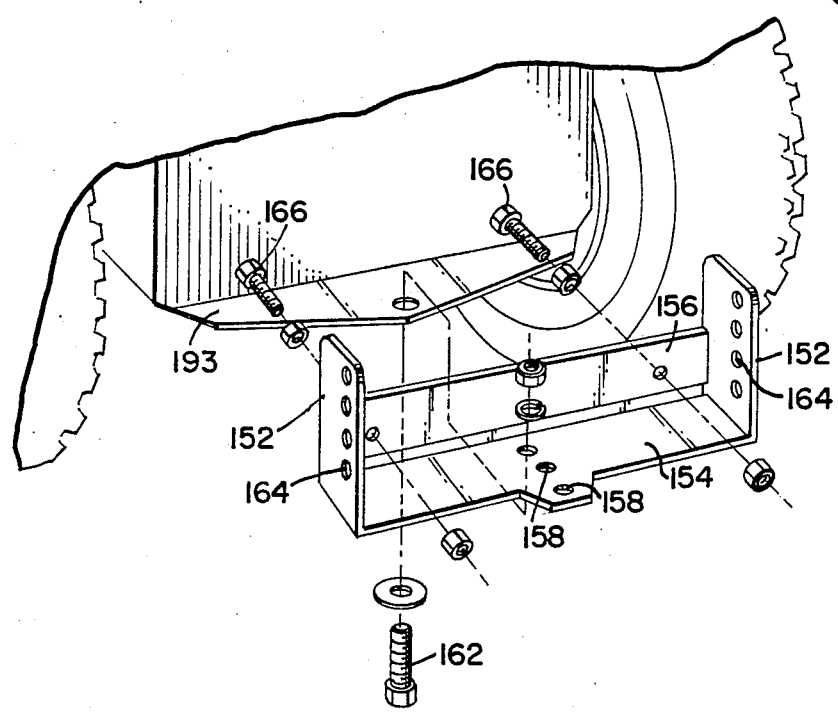
Figure 7B:
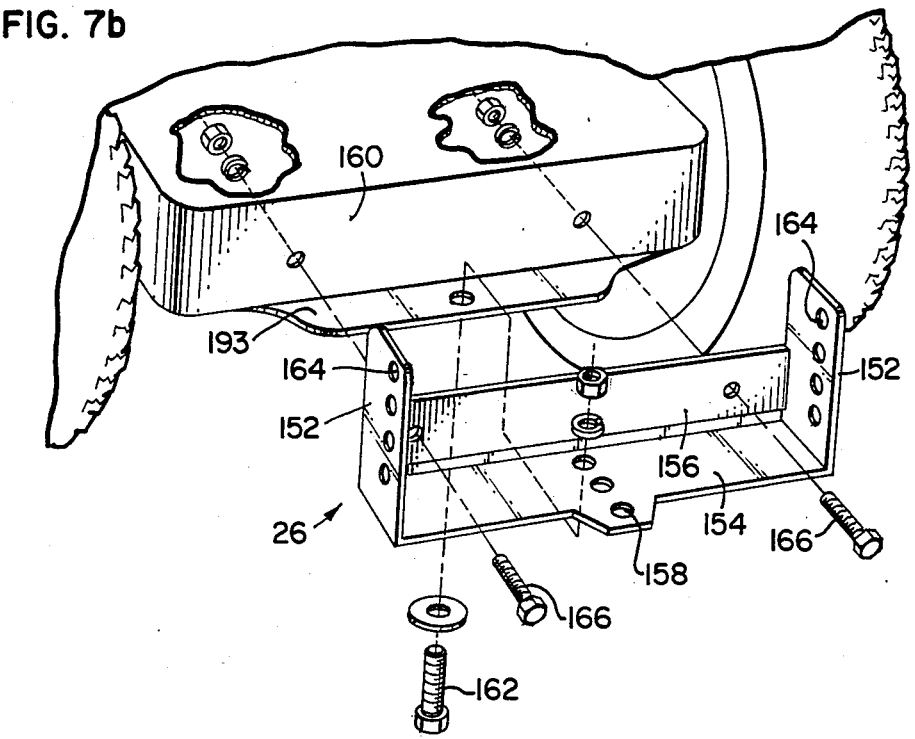
Figure 7C:
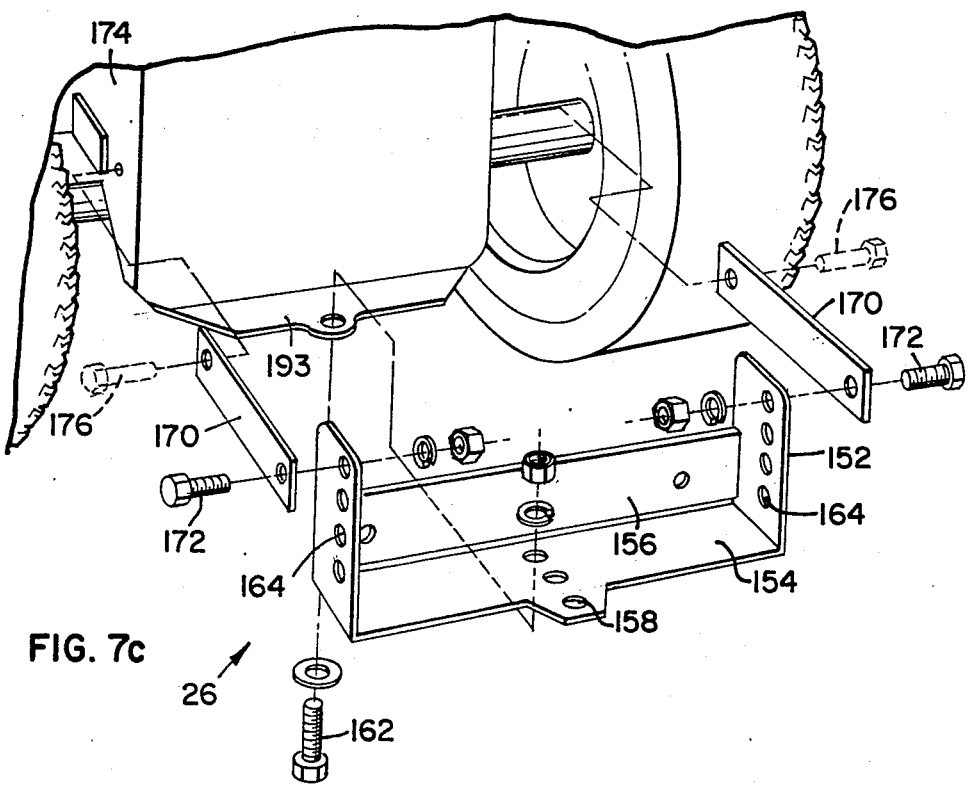
Figure 7D:
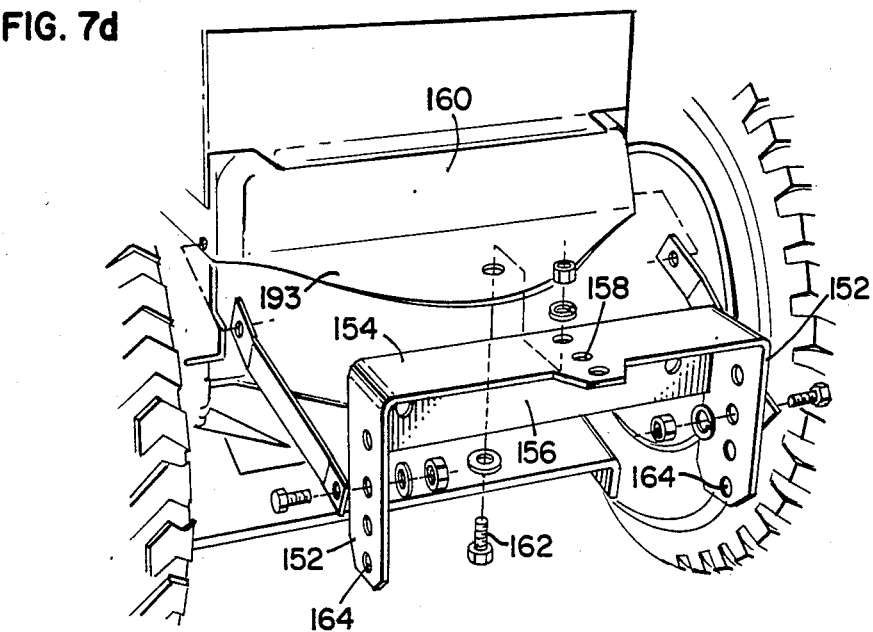

Illustrated in FIGS. 7a through 7f are alternate embodiments of the universal hitch of the present invention. The embodiment shown in FIG. 7b is similar to that shown in FIG. 4. The embodiment shown in FIG. 7a is similar to that shown in FIG. 4, with the exception that the members 166 are used as spacer members to butt against the back plate 160 of the garden tractor 150 to prevent pivoting of the U-shaped bracket 151 about the fastener 162. The embodiment shown in FIG. 7c includes two horizontally extending brackets 170 which are interconnected to the legs 152 of the U-shaped bracket by suitable fasteners 172 and to sides 174 of the garden tractor by suitable fasteners 176. The embodiment shown in FIG. 7d includes a similar U-shaped bracket inverted such that the legs 152 extend generally downwardly. The brackets 170 are similarly used to attach the U-shaped brackets 151 to the sides of the tractor.

Figure 7E:
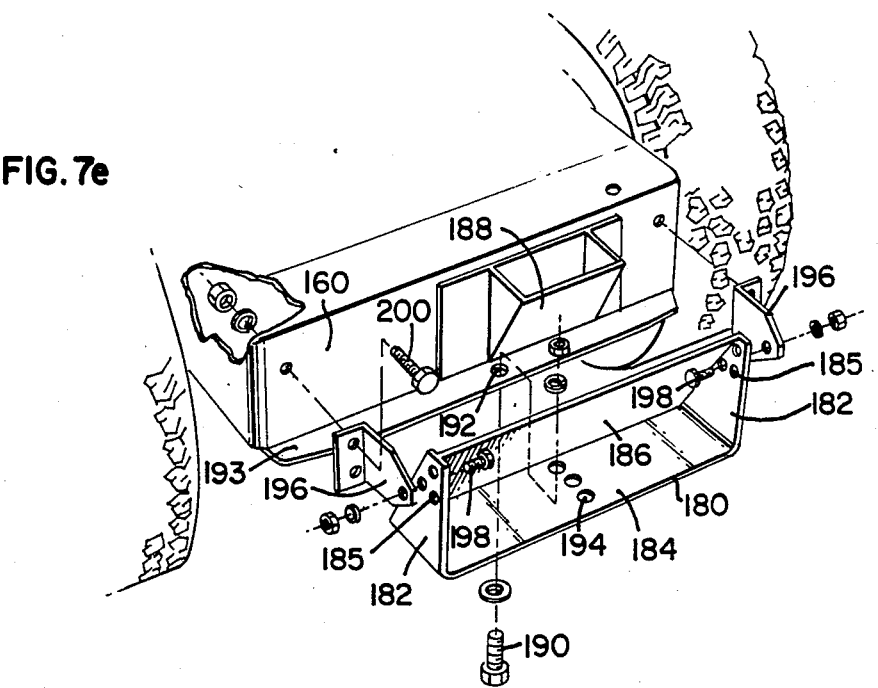

The embodiments shown in FIGS. 7e and 7f are particularly suited for use with John Deere rear engine riders and front engine tractors. The universal hitch shown in FIGS. 7e and 7f includes a generally U-shaped bracket 180 including two spaced apart vertically extending legs 182 interconnected by a horizontal support member 184. The legs of the U-shaped bracket 180 have a generally triangular configuration and include a plurality of apertures 185 in a triangular configuration proximate a top end portion thereof. The legs 182 are further interconnected by a slanted brace member 186 oblique with respect to the support member 184. The brace member 186 provides structural support for the U-shaped bracket and extends outwardly away from the back plate 160 of the garden tractor 22 so as to not interfere with a steel pocket 188 found on the back plate 160 of a John Deere tractor. A fastener 190 is inserted through an aperture 192 in a tow bar 193 of the tractor and through one of a plurality of apertures 194 closest to the back plate 160 of the tractor. L-shaped brackets 196 are interconnected to the outside of the legs 182 by fasteners 198. The L-shaped brackets 196 are in turn fastened to the back plate 160 of the tractor by fasteners 200. Corresponding apertures 185 in the legs 182 are used for attachment of the ends 36 of the H-shaped support frame 28. In FIG. 7f, the brace member 186 includes an aperture 202 to enable the brace member 186 to be fastened to the steel pocket 188 by a fastener 204. One of the legs 182 is securely fastened to the back plate 160 of the tractor by the L-shaped bracket 196.

It will be appreciated that in use, the fabric cover can be readily removed from the trailer to enable use of the trailer as a general utility trailer or fitted over the trailer to enable use of the trailer as a bagger for grass clippings. The grass chute 94 is interconnected to the flexible boot portion of the fabric cover prior to initiating mowing. Frequently, as shown in FIG. 1, the grass chute 94 will include a portion 94a which is pivotally attached at 95 to the main portion of the chute to facilitate interconnection to a bagger or the like. The ends 36 of the H-shaped support frame 28 are interconnected to the universal hitch 26 such that the multi-purpose trailer is pulled behind the garden tractor during the mowing process. When it comes time to empty the multi-purpose trailer, the grass chute 94 is disconnected from the fabric cover 122. The flap portion 132 is pulled forward of the fabric cover 122 as generally illustrated in FIG. 3. The latch handle 102 is pivoted so as to release the trailer box 30 from the H-shaped frame 28 and the trailer box 30 is pivoted upward as generally illustrated in FIG. 3. Prior to dumping the trailer, the trailer might be backed up slightly such that the wheel is pivoted approximately 90° to asure that it does not interfere with the dumping process.

It will be appreciated that although the embodiment of the invention illustrated is shown in use with a lawn tractor having high lift blades which generate sufficient force to force the clippings into the enclosed trailer box, the present invention might also be used with those lawn and garden tractors having conventional blades and utilizing an auxiliary engine driven blower to provide sufficient force to force the clippings into the bagger. Further, it will be appreciated that the grass chute 94 might have any number of configurations. For example, although not shown, most grass chutes are removable from the mower housing.

It is to be understood, however, that even though numerous characteristics and advantages of the invention have been set forth in the foregoing description, together with details of the structure and function of the invention, the disclosure is illustrative only, and changes may be made in detail, especially in matters of shape, size and arrangement of parts within the principles of the invention, to the full extent indicated by the broad general meaning of the terms in which the appended claims are expressed.

What is claimed is:

1. A multi-purpose trailer and universal mounting hitch arrangement for attachment to a garden tractor, the multi-purpose trailer being adaptable for receipt of grass clippings from a grass chute of the garden tractor, the multi-purpose trailer and universal mounting hitch arrangement comprising:
 (a) a trailer having a front end facing the garden tractor and a back end facing away from the garden tractor, comprising:
  (i) an H-shaped support framework including two longitudinally extending, spaced apart elongated members and a transversely extending elongated member interconnecting said longitudinally extending elongated members, the two longitudinally extending members having U-shaped front ends, each of the front ends having a pair of longitudinally aligned apertures;
  (ii) at most, a single wheel supporting said H-shaped support framework above the surface of the ground, said wheel being pivotally interconnected to the H-shaped support framework for pivotal motion, said wheel being located closer to the back end of the H-shaped support framework than to the front end;
  (iii) a trailer box including a floor, two vertically extending sides, a vertically extending front side, and a slanted back side oblique with respect to the floor, the sides of the trailer box having a top and bottom edge including an outwardly extending flange along the top edge thereof, the trailer box being pivotally interconnected to the H-shaped support frame by a substantially U-shaped bracket for pivotal motion about a horizontal axis disposed proximate the back end of the H-shaped frame, the U-shaped bracket being fixedly secured to the floor of the trailer box and pivotally connected to the H-shaped frame;

(iv) latching means for releasably latching the trailer box to the H-shaped support framework;

(v) a support framework rising above the trailer box including vertically extending support members fixedly secured to the sides of the trailer box and horizontally extending members secured to the vertically extending support members; and (vi) a flexible, perforated fabric cover adapted to removably fit over the support framework rising above the trailer box and enclose the trailer box, elongated retention means extending along a bottom edge of the fabric cover for placing the bottom edge of the fabric cover in tension, the bottom edge of the fabric cover cooperating with the outwardly projecting flange to removably retain the fabric cover on the trailer, the fabric cover including a flap portion proximate the back end of the trailer adapted to be pulled over the front of the fabric cover to expose the back end of the enclosed trailer box, the fabric cover including an access port for interconnection of the grass chute of the garden tractor; and (b) a universal mounting hitch comprising a U-shaped bracket including two spaced apart vertically extending legs interconnected by a horizontal support member, an elongated brace member extending between said vertically extending legs of the U-shaped bracket and interconnected to the legs, the horizontal member including a plurality of apertures at differing longitudinal locations to enable attachment to a draw bar of the garden tractor by a pin-like member, the vertical legs including a plurality of apertures at varying vertical locations each of which are adapted to cooperate with the apertures in each of the U-shaped front ends of the longitudinally extending elongated members of the H-shaped frame to receive a pin-like member, the pin-like members providing for pivotal movement of the longitudinally extending elongated members about a substantially horizontal axis.

2. A multi-purpose trailer and universal hitch in accordance with claim 1, wherein the latching means includes a vertically extending, elongated latch handle pivotally attached to the front side of the trailer box for pivotal movement about a horizontal axis, the latch handle including proximate a bottom end thereof a horizontally extending member adapted for pivotal movement between first and second positions, the horizontally extending member being positioned under one of the longitudinally extending elongated members when in the first position so as to latch the trailer box to the H-shaped frame and positioned away from the longitudinally extending elongated member in the second position so as to enable the trailer box to be pivoted relative to the H-shaped frame.

3. A multi-purpose trailer and universal hitch in accordance with claim 1, wherein the support framework rising above the trailer box includes a rectangular support frame adapted for receipt of the grass chute from the garden tractor.

4. A multi-purpose trailer and universal hitch in accordance with claim 1, wherein a dust shield is positioned in the side of the fabric cover opposite the side including the access port of the fabric cover.

5. A multi-purpose trailer and universal hitch in accordance wth claim 1, wherein said retention means includes a horizontally extending elongated elastic member releasably attached proximate at least one of its ends to the bottom edge of the fabric cover.

6. A multi-purpose trailer and universal hitch in accordance with claim 1, wherein the flap portion of the fabric cover includes pockets adapted to receive ends of horizontally extending members of the support framework rising above the trailer box.

7. A multi-purpose trailer for removable attachment to a garden tractor, comprising:

(a) a support framework having a front end facing the garden tractor and a back end facing away from the garden tractor and including two longitudinally, spaced apart elongated members interconnected by a transversely extending member, the longitudinally extending members having U-shaped front ends, each of the front ends havings a pair of longitudinally aligned apertures adapted for pivotal receipt of a pin-like member so as to enable two point pivotal attachment to the garden tractor;

(b) at most, a single wheel supporting said support framework above the surface of the ground, said wheel being pivotally interconnected to the support framework for pivotal motion, the wheel being located closer to the back end of the support framework than to the front end of the support framework;

(c) a trailer box including a floor, two side walls and a front and back wall, the trailer box being pivotally interconnected to the support framework for pivotal motion about a substantially horizontal axis disposed proximate the back end of the support framework;

(d) latching means for releasably latching the trailer box to the support framework proximate the front end of the support framework;

(e) a support framework rising above the trailer box;

(f) a flexible, perforated fabric cover adapted to removably fit over the support framework rising above the trailer box, the cover enclosing the trailer box, the cover further including an opening therein providing a passageway into the enclosed trailer box from a grass chute of the garden tractor; and (g) retention means cooperating with the trailer box and the cover for removably retaining the cover over the support framework.

8. A multi-purpose trailer for removable attachment to a towing vehicle such as a garden tractor, comprising:

(a) a support framework having a front end facing the towing vehicle when attached thereto and an oppositely facing back end;

(b) at least one swivel-mounted, ground engaging wheel for supporting the support framework above a surface of the ground;

(c) rigid hitch means for interconnecting the trailer to the towing vehicle, the rigid hitch means including means preventing relative pivotal movement between the towing vehicle and the trailer about a generally vertical axis, the rigid hitch means further including means enabling relative pivotal movement between the towing vehicle and the trailer about a generally horizontal axis, whereby the trailer can pivot vertically relative to the towing vehicle in uneven terrain;

(d) a trailer box supported by the support framework, the trailer box and support framework including cooperating mounting means for pivotally interconnecting the trailer box proximate a back end thereof to proximate the back end of the support framework for pivotal movement about a generally horizontal axis between a generally horizontal position and a generally upright position whereby a floor portion of the trailer box can be oriented relative to the surface of the ground so as to enable easy removal of material such as grass clippings; and (e) a flexible, removable cover means having a surface area substantially all of which is perforated, interconnected to the trailer box for defining an enclosed area above the trailer box, the cover means enabling air flow from the enclosed area above the trailer box through the cover means and into ambient air surrounding the enclosed area, wherein retention means proximate a bottom edge of the cover means cooperates with a top edge of the trailer box for retaining the bottom edge of the cover means in engagement with the top edge of the trailer box, the cover means further including an inlet means whereby material such as grass clippings can be received in the enclosed area above the trailer box from a source of such material, the cover means further including configuration means for positioning the cover means in a closed configuration and an open configuration, in the open configuration the cover means is partially removed from a back end portion of the enclosed area above the trailer box, whereby material such as grass clippings can be readily removed from the enclosed area above the trailer box when the trailer box is pivoted into an upright position.

9. A multi-purpose trailer in accordance with claim 8, wherein the trailer box is pivotally interconnected to the support framework at a location in back of an axle of the swivel-mounted wheel.

10. A multi-purpose trailer in accordance with claim 8, further including latch means proximate a front end of the trailer box for releasably latching the trailer box to the support framework, whereby upon unlatching the trailer box, the trailer box can be pivoted to an upright position.

11. A multi-purpose trailer in accordance with claim 8, wherein the hitch means includes means providing a two point attachment to the towing vehicle.

12. A multi-purpose trailer in accordance with claim 1, wherein the hitch means includes two horizontally spaced apart elongated members each including a H-shaped bracket proximate for interconnection to the towing vehicle, each of the U-shaped brackets including horizontally aligned apertures adapted to receive an elongated pin member.

13. A multi-purpose trailer in accordance with claim 8, wherein said retention means comprises an elastic member.

14. A multi-purpose trailer for removable attachment to a towing vehicle such as a garden tractor, comprising:

(a) a support framework having a front end facing the towing vehicle when attached thereto and an oppositely facing back end;

(b) at least one swivel-mounted, ground engaging wheel for supporting the support framework above a surface of the ground;

(c) rigid hitch means for interconnecting the trailer to the towing vehicle, the rigid hitch means including means preventing relative pivotal movement between the towing vehicle and the trailer about a generally vertical axis, the rigid hitch means further including means enabling relative pivotal movement between the towing vehicle and the trailer about a generally horizontal axis, whereby the trailer can pivot vertically relative to the towing vehicle in uneven terrain;

(d) a trailer box supported by the support framework, the trailer box and support framework including cooperating mounting means for pivotally interconnecting the trailer box proximate a back end thereof to proximate the back end of the support framework for pivotal movement about a generally horizontal axis between a generally horizontal position and a generally upright position whereby a floor portion of the trailer box can be oriented relative to the surface of the ground so as to enable easy removal of material such as grass clippings; and having a surface area substantially all of which is perforated, (e) a flexible, removable cover means having a surface area substantially all of which is perforated, interconnected to the trailer box for defining an enclosed area above the trailer box, the cover means enabling air flow from the enclosed area above the trailer box through the cover means and into ambient air surrounding the enclosed area, the cover means further including an inlet means whereby material such as grass clippings can be received in the enclosed area above the trailer box from a source of such material, the cover means further including configuration means for positioning the cover means in a closed configuration and an open configuration, wherein the configuration means for positioning the cover between the open and closed configurations includes a flap of material movable between an open and a closed position, in the open configuration the cover means is partially removed from a back end portion of the enclosed area above the trailer box, whereby material such as grass clipping can be readily removed from the enclosed area above the trailer box when the trailer box is pivoted into an upright position.

* * * * *